(No Model.) 2 Sheets—Sheet 1.
J. POOL.
VEHICLE WHEEL.
No. 495,755. Patented Apr. 18, 1893.
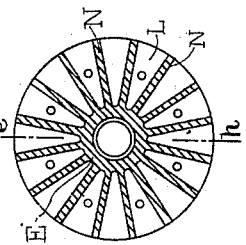
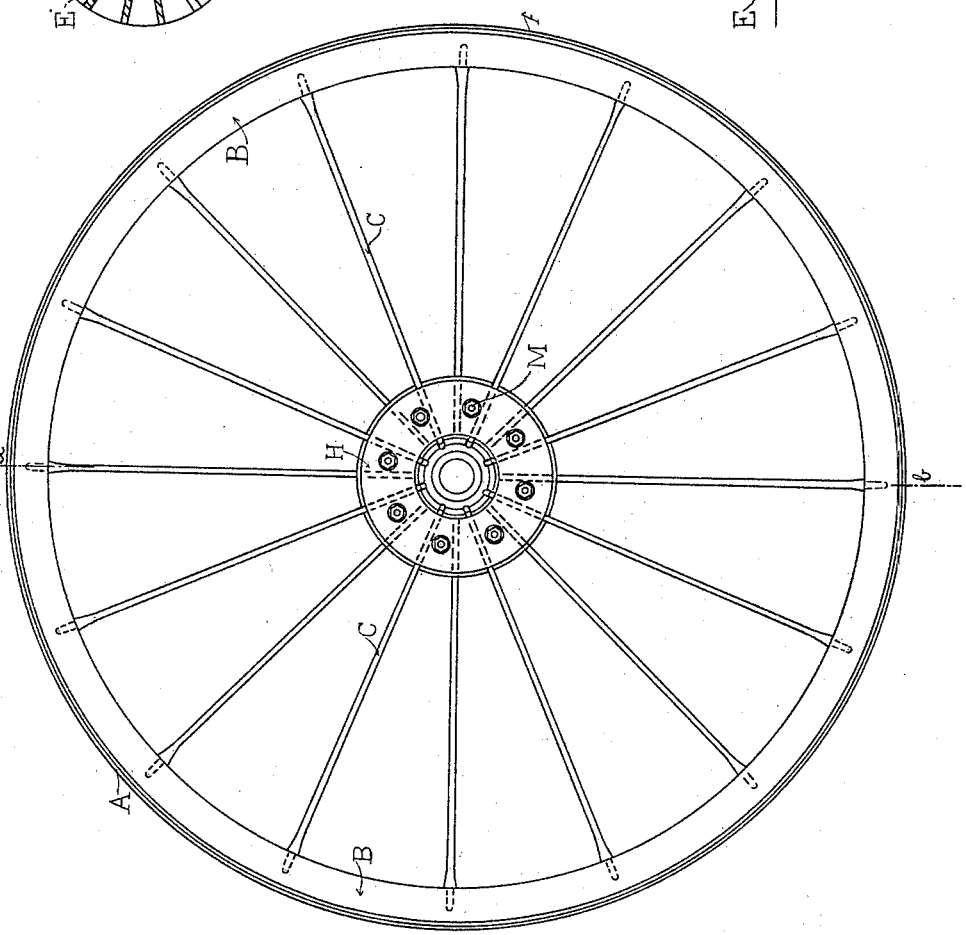
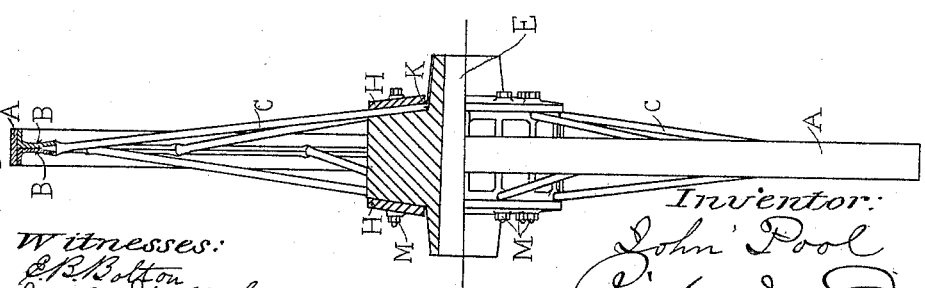
Witnesses:
E. B. Bolton
M. A. Walsh
Inventor:
John Pool
By Richardson
his Attorneys.

(No Model.) 2 Sheets—Sheet 2.

J. POOL.
VEHICLE WHEEL.

No. 495,755. Patented Apr. 18, 1893.

Witnesses:
J. B. Bolton
W. A. Walsh

Inventor:
John Pool
By Richards
his Attorneys.

UNITED STATES PATENT OFFICE.

JOHN POOL, OF MILPARINKA, NEW SOUTH WALES.

VEHICLE-WHEEL.

SPECIFICATION forming part of Letters Patent No. 495,755, dated April 18, 1893.

Application filed April 8, 1892. Serial No. 428,421. (No model.)

*To all whom it may concern:*

Be it known that I, JOHN POOL, surveyor, a subject of the Queen of Great Britain, and a resident of Milparinka, in the Colony of New South Wales, have invented certain new and useful Improvements in the Construction of Wheels for Vehicles and Traveling Machines, of which the following is a specification.

This is an invention applicable to agricultural implements, carts, carriages and various kinds of vehicles. It is designed to afford a light elegant and durable wheel of iron one of the chief objects being to avoid the delay and loss occasioned through the shrinkage of wooden wheels in hot climates and the consequent need of frequent tightening up of the parts.

The main principles of my invention are the construction of the wheel so that the spokes are entirely free that is to say not welded or riveted either to the rim or to the hub and secondly, the tightening up of the wheel by causing the spokes to press outward from the center. All the parts except the hub, which should be cast, are capable of being supplied and put together at an ordinary blacksmith's forge. The tire and fellies are made of a form combining lightness and strength in the manner hereinafter described. The spokes are then prepared and fitted or adjusted if necessary and the whole of the parts drawn together and tightened by screwing up two nave plates, one on either side of the nave which press the spokes home in their respective sockets.

In order that my invention may be clearly understood I will now describe the same by reference to the accompanying drawings in which similar letters indicate the same parts in all figures.

Figure 5:
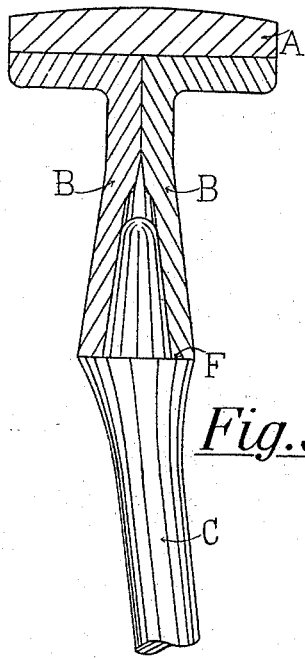
Figure 6:
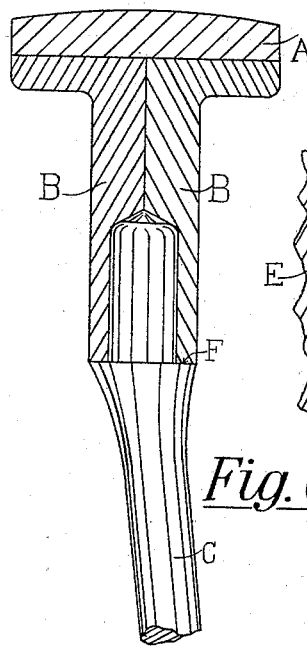
Figure 9:
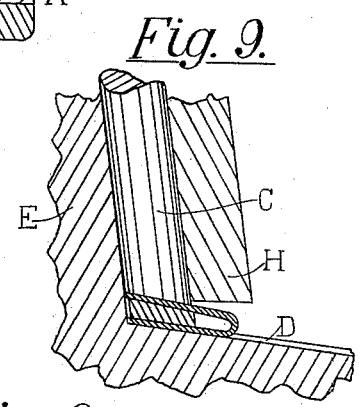
Figure 8:
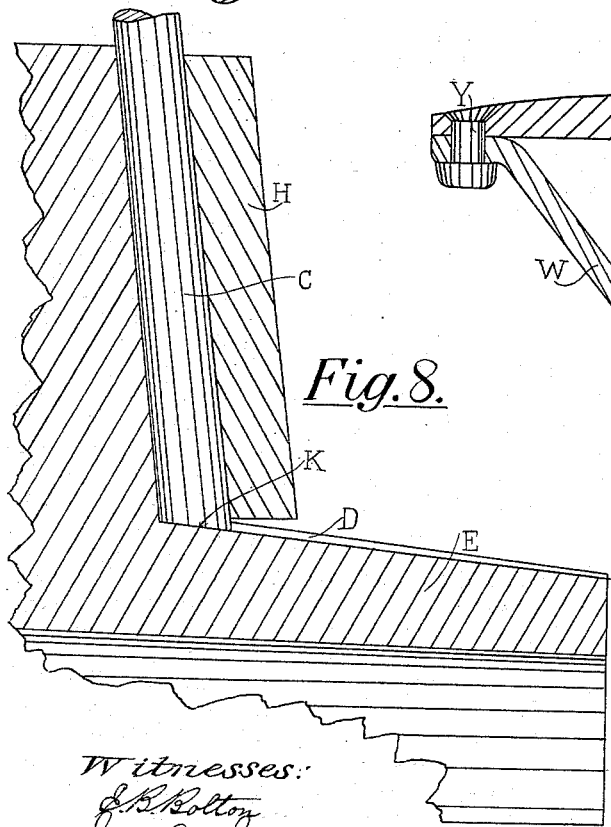
Figure 7:
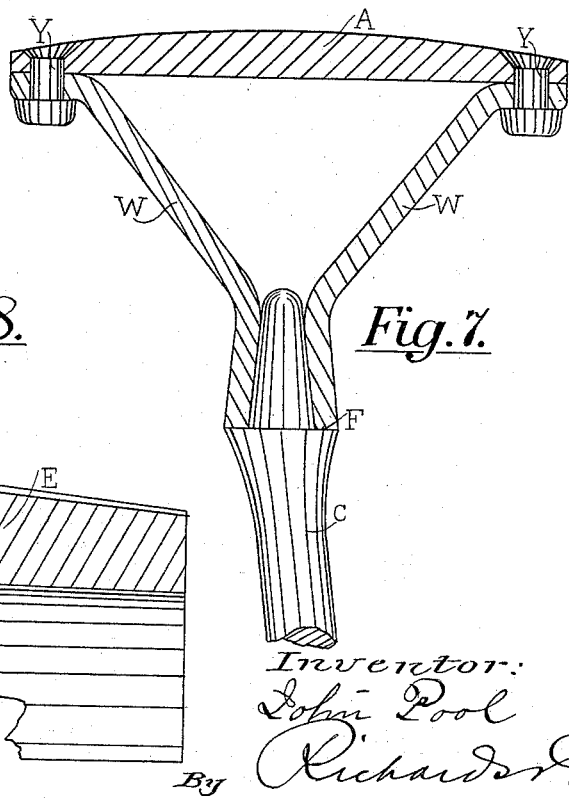

Figure 1. is a side elevation of my improved wheel. The upper half of Fig. 2 is a section on line $a-b$ of Fig. 1 and the lower half an end view. Fig. 3 is a vertical section of the hub on line $c-d$ of Fig. 4 and Fig. 4 shows in the upper half a section of the hub on the line $e-h$ of Fig. 3 and in the lower half an outside view of the hub. Figs. 5, 6 and 7 are sections showing different methods of fixing the spoke into the rim flange. Fig. 8 is a section showing how the spoke is fitted at the hub and Fig. 9 is a section showing a small spring wedge at the base of the spoke.

The tire A is preferably made of steel.
The rim is formed of two lengths of angle iron B B corresponding to the felly in a wooden wheel.

C C are the spokes which may be either round oval or square and may be hollow or solid and made of wrought iron or steel. The outside end of each spoke has a shoulder F to bear against the rim of the wheel and the hub end is beveled to fit into the angle K as shown in Fig. 8.

The hub E is made preferably of cast iron or brass the interior cone being roughened like a horse shoe file in order that the common axle boxes may be fitted into it by means of wooden wedges in the ordinary manner.
The exterior surface is provided with grooves D for the purpose of receiving the spokes C and the spaces L between the ribs N are for lightening the hub.

H H are two annular wrought iron or brass disks or caps which are drawn together by the bolts and nuts M of which there may be four six or eight as preferred.

The construction of my wheel is performed as follows: I take two lengths of angle iron to form the ribs B B. These are heated and then turned or pinched round in a machine similar to a tire bending machine until they are of the required shape. They are then placed together and points marked for the ends of the spokes. Each flange is next separately creased to allow the ends of the spokes C to be fitted in. Afterward the two flanges B B are riveted together, the tie is shut on in the usual manner, and riveted to the flanges. If necessary or preferred the holes for the spokes may be creased out nearly to the correct size and then finished with a drill or reamer. The hub is now placed in the center of the rim and each spoke is fitted in its place. The spokes are of such length that when forced home the shoulder F is tight up against the rim and the bevel at the hub end is tight against the corner or angle K (see Fig. 8). If the spokes are too long they may be shortened by filing or cutting a piece off the beveled end and if too short a washer may be placed between the shoulder F and the rim B or the spoke may be bound with wire but I prefer if possible to heat the spoke and hammer it out. If elasticity or spring is required though I do not consider this necessary in most cases and do not claim this as part of my invention a V shaped wedge of steel inclosing a piece of india-rubber may be inserted as shown in Fig. 9. When the spokes have all been made the right length they are laid in position with the small ends inserted in the holes in the rim between the flanges B B and the hub ends laid over the grooves D; the plates H H are then placed over the ends of the hub and are drawn together by the bolts M thereby pressing the hub ends of the spokes up toward the center and forcing the shoulders F against the flanges B B and forming a compact strong wheel in which no undue stress is placed upon any part. The nuts on the bolts M may be prevented from coming off by any of the known nut locking devices. If the spoke is tubular the bearing may be taken by the tire at the end instead of by a shoulder F as in the solid spokes. The arrangment shown in Fig. 7 is an alternative form to enable the wheel to run more easily through mud or sand. The annular angle irons B B are replaced by two annular strips W W having a flange at either edge. They are riveted to the tire by rivets such as Y Y and riveted together along the inner flange and have holes creased out for the ends of the spokes C similarly to the angle irons B B but owing to the shape of the tire and rim it is evident that it would not sink so deeply and moreover the sand or mud would slip off and not nearly so much would be raised as with the flat tire and angle irons.

A wheel constructed according to my method would be most suitable for wear in hot climates as it would obviate the delay and expense caused through the shrinkage of wooden wheels and if a spoke broke a new one could be easily made at any blacksmith's and placed in position by simply unscrewing the nuts M and removing the annular disk H. The proportions shown are those for an ordinary wheel but a wheel could be made much heavier or lighter to meet any requirement and might also be nickel-plated.

The annular disks H may be made with grooves to fit over the spokes if preferred but I have not shown this in the drawings.

I claim—

1. A wheel consisting of the tire A the rim B consisting of two parts bearing on the inner face of the tire and having sockets, the spokes C having reduced ends fitting said sockets and shoulders F bearing against the inner edges of the rim and means for drawing up the ends of the spokes at the hub, substantially as described.

2. A wheel consisting of the tire A, the angle plates B forming the rim, sockets therein, shouldered spokes fitting said sockets, a tapering hub having grooves in its periphery, the spokes having inclined ends fitting the grooves and the disks H H for clamping the spokes to the hub, substantially as described.

In testimony that I claim the foregoing as my invention I have signed my name, in presence of two witnesses, this 11th day of September, 1891.

JOHN POOL.

Witnesses:
HENRY CHARLES SCHWUCKER,
ERNEST LESLIE MAITLAND.